United States Patent
Bruhmann et al.

[11] Patent Number: 6,082,527
[45] Date of Patent: *Jul. 4, 2000

[54] LINING FOR DRIVING OR RETURN DRUMS OR PULLEYS FOR CONVEYOR BELTS

[75] Inventors: Wolfgang Friedrich Wilhelm Bruhmann, Leichlingen, Germany; Emmanuel Davidts, Ecaussinnes, Belgium

[73] Assignees: Technic Gum, Soignies, Belgium; M.I.C.K.E. Bruhmann GmbH & Co. KG, Duisburg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/996,276

[22] Filed: Dec. 22, 1997

[30] Foreign Application Priority Data

Dec. 20, 1996 [EP] European Pat. Off. ............... 96870161

[51] Int. Cl.⁷ .................................................. B65G 23/04
[52] U.S. Cl. ........................... 198/835; 198/842; 475/191
[58] Field of Search ................................. 198/834, 835, 198/842, 843; 492/31, 38, 48, 59; 474/DIG. 902, 162, 163, 184, 185, 186, 191

[56] References Cited

U.S. PATENT DOCUMENTS

| | | | |
|---|---|---|---|
| 1,330,988 | 2/1920 | Sayre . | |
| 2,628,709 | 2/1953 | Steinmetz | 474/189 |
| 2,839,785 | 6/1958 | Stevens | 492/31 |
| 3,339,818 | 9/1967 | Morrow | 492/31 |
| 3,354,735 | 11/1967 | Holz | 474/185 |
| 3,607,606 | 9/1971 | Beninga | 428/908.8 |
| 4,284,409 | 8/1981 | Teslaar | 474/185 |
| 4,290,761 | 9/1981 | Suginaka | 198/835 |
| 4,551,894 | 11/1985 | Beucker | 492/31 |
| 4,586,224 | 5/1986 | Sartor et al. | 492/31 |
| 4,718,544 | 1/1988 | Herren | 198/843 |
| 4,832,669 | 5/1989 | Holz | 474/185 |
| 4,855,174 | 8/1989 | Kawamoto | 474/191 |
| 5,119,924 | 6/1992 | Kaminski | 198/834 |

FOREIGN PATENT DOCUMENTS

| | | |
|---|---|---|
| 0239660 | 10/1987 | European Pat. Off. . |
| 2231693 | 12/1974 | France . |
| 2298732 | 8/1976 | France . |
| 2061554 | 7/1971 | Germany . |
| 2930186 | 7/1980 | Germany . |
| 3344653 | 6/1984 | Germany . |

*Primary Examiner*—Christopher P. Ellis
*Assistant Examiner*—Khoi H. Tran
*Attorney, Agent, or Firm*—Watson Cole Grindle Watson, P.L.L.C.

[57] ABSTRACT

Lining for driving or return drums or pulleys for conveyor belt. A lining for driving or return drums or pulleys for conveyor belts and all surfaces subjected to wear by friction includes an elastic material 2 incorporated in which are porous ceramic elements 4 projecting from the surface of the lining.

5 Claims, 1 Drawing Sheet

LINING FOR DRIVING OR RETURN DRUMS OR PULLEYS FOR CONVEYOR BELTS

BACKGROUND AND SUMMARY OF THE INVENTION

The present invention relates to a lining for driving or return drums or pulleys for conveyor belts and any surfaces subjected to wear by friction.

It is to be understood that the word "lining" is to be taken as having its widest meaning and that the invention therefore also applies to any material which may find an application in the conveyance or storage of products which can produce wear caused by friction or contact of products in motion.

In the more precise case of driving drums for conveyor belts which are the basis of the present patent application, it will be observed that the efficiency of the drums driving the conveyor belts may be considerably increased by ensuring a high coefficient of friction between the drum and the conveyor belt, while having a favourable effect on the resistance to wear of these two components. It is for this reason that the drums in question have already been fitted with linings comprising at least partially elements of a ceramic material, and that this has been done with a view to increasing the coefficient of friction responsible for a good contact between the belt made of natural or synthetic rubber and the drum.

This is extremely important when the conveyor belts work outdoors where dampness, water, mud, ice and certain other factors have an unfavourable effect on the proper functioning of the installation.

Water and dampness in general have a very unfavourable effect on the efficiency of a conveying plant consisting of a conveyor belt, a driving drum and several auxiliary drums, and this is clearly because of a poor coefficient of friction between the drums and the belts.

All linings of this type must satisfy the requirements in the following list:
 (a) increase in the adhesion between the drum and the conveyor belt,
 (b) only slight wear of the lining,
 (c) only slight wear of the conveyor belt,
 (d) protection against abrasion and impacts from the metallic surfaces on to which these linings are applied.

Known linings, generally used until now, are made from natural or synthetic rubbers, from polyurethane or from equivalent synthetic materials providing a fairly pronounced elasticity. They may have channels or grooves and may or may not be covered with ceramic pads generally having rough surfaces. The purpose of the channels or grooves is to evacuate water as quickly as possible and to prevent aquaplaning when working in conditions which are very damp or involve a lot of water.

Similarly, very pronounced sliding occurs when the conveyor belt is working under normal conditions but at a steep angle.

The presence of rough ceramic pads on the surface of a rubber lining considerably increases the coefficient of friction but only as long as the roughness or geometrical shapes have not been smoothed out by wear or as long as the roughness has not been clogged up by mud, dust, etc. In any case, the linings will have channels or grooves allowing water to be evacuated.

The aim of the invention is therefore to produce linings for drums or pulleys which overcome the disadvantages, the main examples of which have been described above.

In order to achieve this aim in conformity with the invention, the lining according to the invention consists of an elastic material incorporated in which are porous ceramic elements projecting out of the surface of the lining.

Still according to the invention, the aforesaid porous ceramic elements are distributed in such a way as to create between them channels for the evacuation of water.

A noteworthy characteristic of the invention lies in the fact that the porous ceramic elements consist of particles which are bound to each other while allowing sufficient space to remain between the particles to let the water penetrate and then be evacuated under the effect of the centrifugal force.

In a first embodiment, the aforesaid porous ceramic elements are anchored to the surface of the elastic material forming the lining.

In another embodiment, the aforesaid porous ceramic elements are anchored at various depths within the elastic material forming the lining.

The term "elastic material" here denotes a natural or synthetic, polymerised or vulcanised, elastomer.

BRIEF DESCRIPTION OF THE DRAWINGS

Other details and advantages of the invention will emerge from the description given below of a lining for driving or return drums or pulleys for conveyor belts according to the invention. This description is given only as an example and does not limit the invention. The reference numbers refer to the attached drawings.

DETAILED DESCRIPTION OF THE PREFERRED EMBODIMENT

Figure 1:
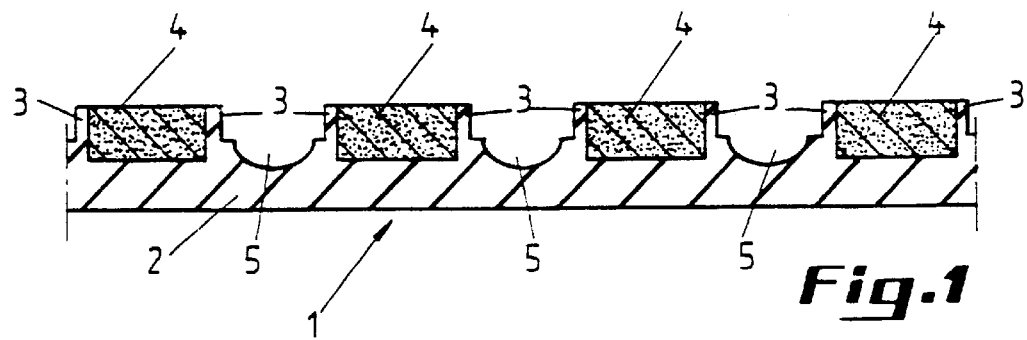
FIG. 1 is a cross-sectional view taken through the line 1-1 of FIG. 2.

The lining for driving drums, return pulleys or related applications may be in the form of plates or strips of variable dimensions.

The lining 1 consists of any suitable elastic material such as various natural or synthetic rubbers. It may also be made from a synthetic material of the "polyurethane" type or a material having similar mechanical properties.

In the elastic material 2 from which the lining is made, cavities 65 are provided which, in the figures, are shown as rectangles, but it is obvious that these cavities may have the most varied geometrical shapes such as squares, triangles, circles, etc.

In the cavities 6 are housed the porous ceramic elements 4. The porous ceramic material used consists of one or more of the components or combinations listed in detail below and quoted as examples because of their great resistance to wear. These components are aluminum or iron oxide, zirconium oxide, magnesium or chromium oxide, silicon carbide or dioxide, silicon nitride, or combinations of these, quartz or zirconium powder, neutral graphite, kaolin, ground slate, talc, mica, fibres such as aluminum or potassium titanite, glass, glass wool and granular materials such as coarse silicon, course powdered rubber and their technical equivalents.

The porous ceramic elements 4 are obtained by binding ceramic particles using polymeric binders, organic or inorganic binders, the respective percentage proportions of the binder and the ceramic particles varying from 1:99 to 99:1.

The ceramic particles may have been bonded by a process of concentration.

The ceramic elements may be completely or almost completely embedded in the elastic material from which the lining is made. By ceramic elements embedded in the elastic material must be understood elements of any geometrical shape whose working surface from the point of view of friction is flush with the surface of the elastic material and which are anchored in this material, either because of their appropriate profile, or through the use of mechanical means.

Figure 2:
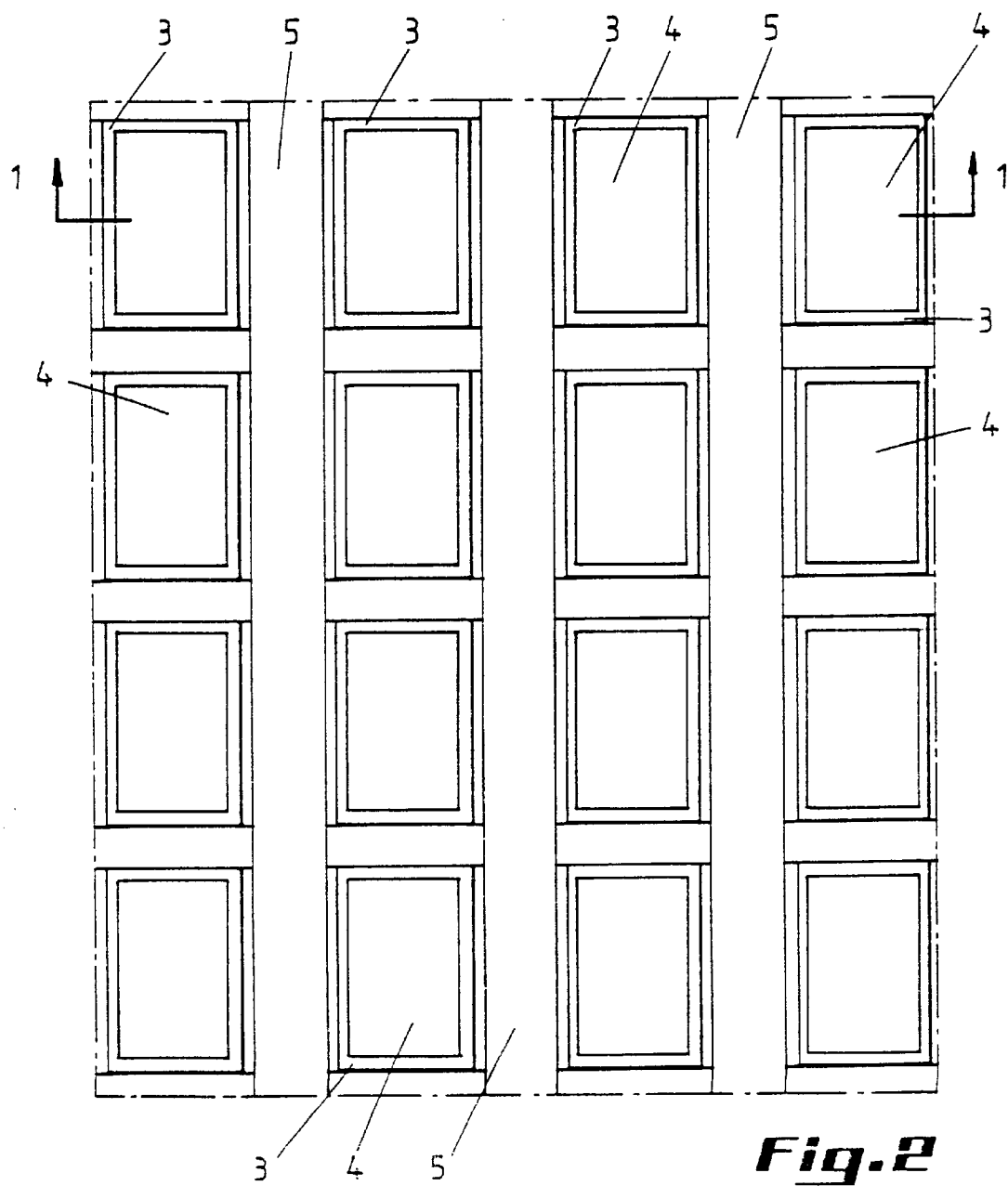
FIG. 2 is a plan view of a lining or part of a lining according to the invention.

In an embodiment represented by FIG. 1, these ceramic elements project above the elastic material forming the essential part of the lining. The porous ceramic elements then stand out appreciably from the elastic material and are held by this material by classic means known to one skilled in the art and/or are surrounded by this elastic material as represented in FIG. 2. In this figure, each porous ceramic element is held laterally by wells 3 of elastic material. These lateral walls 3 appear during the moulding operation.

The elastic material forming a wall 3 partially surrounding the ceramic elements 4 results from a moulding operation during which the lining is formed, the ceramic elements, produced in a previous stage, having been arranged in a geometrical network in the mould.

In FIGS. 1 and 2, channels 5 can be seen separating the rows of ceramic elements 4 and designed to accelerate the evacuation of water with a view to preventing the effect known as "aquaplaning" between the drum and the conveyor belt. The profile of these channels and the angle made with the geometric axis of the drum are variable and will be defined depending on the special circumstances. It is therefore possible to form various special networks.

In operation, the ceramic elements 4 are pressed strongly on to the conveyor belt. The tension in the conveyor belt creates a certain pressure on the surface of the lining and causes the water which has accumulated between the lining and the drum to be squirted out.

The porous ceramic elements produce a considerable increase in the coefficient of friction between the drum and the conveyor belt thanks to their surface being capable of producing an effect comparable to that of a sandstone. This effect, combined with that which results from the random arrangement of the particles forming the ceramic elements, makes it possible for the lining to grip the surface of the drum more effectively. The ceramic elements of the lining penetrate at a certain slightly softer point in the rubber surface of the conveyor belt, and they do this during the short period of contact between the drum and the belt.

The result is a complete elimination of the water present between these two essential components of the conveying plant, an effect due to the centrifugal force produced by the rotation of the drum. The water is also eliminated thanks to the presence of the channels 5, whose arrangement will be designed with a view to making this evacuation of water as efficient as possible. This is in fact one of the essential aims of the present patent application.

The ceramic elements 4, which are embedded or incrusted in the elastic material in order to make them project somewhat from the surface of the elastic material 2, are produced from a large number of components, the main examples of which are listed below. These components, which may be used separately or in various mixtures, are as follows: aluminum or iron oxide, zirconium oxide, magnesium or chromium oxide, silicon carbide or dioxide, silicon nitride, or combinations of thee, quartz or zirconium powder, natural graphite, kaolin, ground slate, talc, mica, fibres such as aluminum or potassium titanite, glass, glass wool and granular materials such as coarse silicon, coarse powdered rubber and their technical equivalents.

These components may be bound together using a composition comprising a binder of the epoxy resin-bisphenol A type and a hardener such as an aliphatic/cycloaliphatic polyamine. The same result can also be obtained by using a resin in the form of epoxy-bisphenol A, the hardener in this case being a dicyandiamide.

The ratio between the binder and the ceramic material determines the characteristics of the finished product from the point of view of the coefficient of friction, the porosity, the resistance to wear, the hardness, the density, etc.

Thus, more binder increases and less binder reduces the aforesaid values, except for the friction and the porosity. Reducing the amount of binder increases the coefficient of friction and the porosity.

Higher coefficients of friction, greater than a $\mu$ of 0.8, are obtained by using a proportion of binder between 5 and 20%. Moderately high coefficients of friction of around $\mu=0.35-0.5$ are obtained with a proportion of binder from 25% to 45%, moderately low coefficients of friction of around $\mu=0.2-0.3$ are obtained with a proportion of binder between 50 and 65%. For low coefficients of friction, $\mu=0.1-0.2$, 70 to 95% of binder are used.

Examples of formulae corresponding to four levels of the coefficient of friction are given below:

| (1) High coefficient of friction | |
|---|---|
| coarse kyanite | 10% |
| coarse aluminium oxide | 30% |
| medium grain size zirconium sand | 15% |
| coarse borosilicate glass | 30% |
| coarse scrap rubber | 5% |
| wollastonite needles | 10% |
| binder | 15% |
| (2) Medium to high coefficient of friction | |
| coarse powdered quartz | 10% |
| fine powdered quartz | 10% |
| medium grain size aluminium oxide | 20% |
| (coarse) iron aluminosilicate glass | 25% |
| medium grain size scrap rubber | 15% |
| coarse synthetic graphite | 5% |
| alumino-titanite fibre | 5% |
| medium grain size granite | 10% |
| binder | 35% |
| (3) Medium to low coefficient of friction | |
| fine powdered quartz | 7.5% |
| coarse powdered quartz | 7.5% |
| fine zirconium powder | 10% |
| medium grain size borosilicate glass | 15% |
| fine synthetic graphite | 10% |
| medium grain size kaolin | 20% |
| fine powdered slate | 20% |
| mineral wool fibre | 10% |
| (4) Low coefficient of friction | |
| fine powdered quartz | 5% |
| fine silicon carbide | 15% |
| potassium titanite fibre | 15% |
| fine talc | 15% |
| fine chalk | 10% |
| fine mica | 15% |
| fine natural graphite | 15% |
| crushed glass fibre | 10% |
| binder | 85% |

The description just given of a lining comprising ceramic elements according to the invention has the consequence that, not only are its qualities considerably improved in the areas described above, but that the characteristics and the properties of these ceramic elements may vary over wide ranges in order to satisfy specific requirements.

What is claimed is:

1. Lining for driving or return drums or pulleys for conveyor belts and all surfaces subject to wear by friction which consists of an elastic material containing porous ceramic elements which are anchored in the elastic material and extend to at least a surface of said elastic material, a solid epoxy resin-bisphenol A binder and an aliphatic/cycloaliphatic polyamide hardener, said porous ceramic elements being selected from the group consisting of aluminum oxide, iron oxide, zirconium oxide, magnesium oxide, chromium oxide, silicon carbide, silicon dioxide, silicon nitride, quartz, zirconium powder, natural graphite, kaolin, ground slate, talc, mica, aluminum fibers, potassium titanite fibers, glass, glass wool, coarse silicon, and course powdered rubber, said ceramic porous elements being bound together by said bisphenyl A binder and said aliphatic/cycloaliphatic polymer hardener.

2. Lining according to claim 10, wherein said porous ceramic elements are distributed in such a way as to create channels therebetween for the evacuation of water.

3. Lining according to claim 10, wherein the porous ceramic elements consist of particles bound together while allowing sufficient space to remain between the particles to let the water penetrate and then be evacuated under the effect of centrifugal force.

4. Lining according to claim 10, wherein said porous ceramic elements project from the surface of the elastic material.

5. Lining according to claim 10, wherein said porous ceramic elements are flush with the surface of the elastic material.

* * * * *